United States Patent
Ang

(10) Patent No.: US 6,918,116 B2
(45) Date of Patent: Jul. 12, 2005

(54) METHOD AND APPARATUS FOR RECONFIGURING THREAD SCHEDULING USING A THREAD SCHEDULER FUNCTION UNIT

(75) Inventor: Boon Seong Ang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 779 days.

(21) Appl. No.: 09/854,657

(22) Filed: May 15, 2001

(65) Prior Publication Data

US 2002/0174166 A1 Nov. 21, 2002

(51) Int. Cl.[7] .............................................. G06F 9/46
(52) U.S. Cl. ..................................................... 718/102
(58) Field of Search ......................................... 718/102

(56) References Cited

U.S. PATENT DOCUMENTS 5,379,428 A * 1/1995 Belo ........................... 718/103
5,630,128 A * 5/1997 Farrell et al. ............... 718/103

* cited by examiner

Primary Examiner—Meng-Al T. An
Assistant Examiner—Camquy Truong

(57) ABSTRACT

A method and system for thread scheduling to run in parallel with a main processor, comprising: obtaining parameter values for a plurality of different threads; performing logic functions, in parallel with, but without interrupting the main processor, on said parameter values to determine if thread scheduling should be reconfigured, and if so, which thread should be enabled; and sending an interrupt signal to interrupt the main processor if thread scheduling is to be reconfigured. The parameters may be obtained by monitoring the values from thread processes held in registers with fixed addresses, or by snooping memory traffic for selected parameters. The logic functions, in a preferred embodiment, may be implemented using reconfigurable hardware logic.

29 Claims, 3 Drawing Sheets

METHOD AND APPARATUS FOR RECONFIGURING THREAD SCHEDULING USING A THREAD SCHEDULER FUNCTION UNIT

FIELD OF THE INVENTION

The present invention relates generally to multi-tasking for processors, and more particularly, to a method and apparatus for thread scheduling to run in parallel with a main processor.

BACKGROUND OF THE INVENTION

And processors, particularly those employed in embedded applications, often multi-task between a number of cooperative software tasks that interact with specialized hardware that operates in parallel. Because the results of one task/hardware enables processing in other tasks/hardware, effective scheduling to delivery the best throughput and latency has to take into account the real-time progress that each software task or simultaneously operating hardware is making in its process. A key to delivering this effective scheduling is to dynamically track the status of each task, and using the information to continuously address the priority of each of the pending tasks. In relation to the foregoing and for purposes of describing the present invention, the term "thread" is intended to mean a program that can execute independently of other programs within the system.

Referring now to FIG. 1, there are shown three threads, T1, T2, and T3. T1 produces data that is fed into thread T2. A queue, Q12, is used to store the output data from T1, so that the threads T1 and T2 need not operate in exact lock step. Similarly, the thread T2 produces data consumed by thread T3, and this data is stored temporarily in queue Q23. In the example shown in FIG. 1, it is assumed that the data in each queue takes up space that is only freed when the data is consumed. An effective thread schedule may base its scheduling decisions on the amount of data in each queue. When a predetermined amount of data is held in a particular queue, it is time to schedule to have that data consumed. Conversely, when there is little data left in a queue, then it is time to schedule the producer of data for that particular queue.

In a typical processor, a large number of threads will be present, with some of these threads actually working together with specialized, simultaneously operating hardware to implement various functions. In the example shown in FIG. 1, the thread T3 may be the device driver for an Ethernet device that consumes data from the queue Q23. Additionally, the thread T2 may be enabled by the completion of DMA performed by specialized DMA hardware that is programmed by thread T1.

This embodiment is shown in FIG. 2, with the elements that T1, T2, T3, Q12, and Q23 taking the same meaning as FIG. 1. Accordingly, there is parallelism in the overall system even while software threads share processor power in a multi-tasking fashion. In order to obtain the maximal throughput, the software threads should be scheduled in a way that ensures that the parallel hardware devices are continually fed work.

Traditional scheduling, using fixed prioritized interrupts of the main processor and software based thread scheduling, is unable to achieve this flexibility. Hardware interrupt scheduling is typically performed using fixed priority as determined by the interrupt source. In the example shown in FIG. 1 and FIG. 2, however, whether an interrupt triggered by the DMA hardware or an interrupt triggered by the Ethernet device should have higher priority may depend, in any given instance, on the status of the queues Q12 and Q23.

Accordingly, a typical prior art software thread scheduler, while capable of more sophisticated scheduling decisions, runs the risk of incurring high overhead in evaluating the desired scheduling functions. In the interest of efficiency, most software thread schedulers employ several prioritized thread/task queues, and decide at the time a thread/task is suspended which queue it is placed into. Note that the terminology of placing a thread into a scheduling queue is a conventional terminology which means putting data that identifies a thread into the queue. The entity that decides what thread to run will examine the queue, and use the information stored therein to cause the relevant thread to run.

The typical software thread scheduler does not deliver all of the functions desired; in particular, it is unable to dynamically prioritize interrupts in order to decide whether to interrupt the current thread. The only way to "fake" this is to periodically interrupt the executing thread and evaluate the scheduling decision. When the quantum of work scheduled is small relatively to the cost of an interrupt, this is not a feasible solution.

SUMMARY OF THE INVENTION

Briefly, the present invention comprises, in one embodiment, a method for thread scheduling to run in parallel with a main processor, comprising the steps of: obtaining parameter values for a plurality of different threads; performing logic functions, in parallel with, but without interrupting the main processor, on the parameter values to determine if thread scheduling should be reconfigured, and if so, which thread should be enabled; and sending an interrupt signal to interrupt the main processor if thread scheduling is to be reconfigured.

In a yet further aspect of the present invention, the performing logic functions step is performed on a continuous basis.

In a yet further aspect of the present invention, the obtaining parameter values step comprises monitoring the values from thread processes held in memory mapped registers with fixed addresses.

In a yet further aspect of the present invention, the performing logic functions step comprises performing the logic functions substantially simultaneously on a substantial plurality of the parameter values.

In a yet further aspect of the present invention, the performing logic functions step is not performed by a microprocessor, but rather by hardware logic.

In a yet further aspect of the present invention, the performing logic functions step comprises performing logic functions on reconfigurable hardware.

In a yet further aspect of the present invention, during the performing logic functions step, the steps are performed of receiving at least one additional parameter value; and performing logic functions with the at least one additional parameter value to determine if thread rescheduling should be reconfigured.

In a yet further aspect of the present invention, the performing logic functions step comprises performing the logic functions with a microengine or microprocessor.

In a yet further aspect of the present invention, during performing logic functions step in the microengine, the steps are performed of receiving at least one additional parameter value; and when the microengine or microprocessor is free, performing logic functions with the at least one additional parameter value to determine if thread rescheduling should be reconfigured.

In a yet further aspect of the present invention, the performing logic functions with the at least one additional parameter comprises performing a different logic function as compared to an immediately preceding logic function performed in the performing logic functions step.

In a yet further aspect of the present invention, local copies of the parameter values are held in a set of registers, and wherein the obtaining step comprises snooping memory operations for data addressed to a plurality of predetermined locations and updating the local copies thereof in the set of registers.

In a yet further aspect of the present invention, the snooping memory operations include memory operations for the main processor and memory operations of other processors in a multiprocessor system.

In a yet further aspect, the present invention comprises the step of, receiving at least one additional parameter value during the performance of the performing logic functions step; and when the initial performance of the performing logic functions step is completed, performing logic functions with the at least one additional parameter value to determine if thread rescheduling should be reconfigured.

In a yet further aspect of the present invention, one of the parameter values is a time devoted to a currently running thread.

In a yet further aspect of the present invention, one of the parameter values is an amount of data that a predetermined queue is able to produce.

In a yet further aspect of the present invention, one of the parameter values is an amount of data that may be consumed by a predetermined queue.

In a yet further aspect of the present invention, the thread scheduling function and the function of the main processor are performed on a single chip.

In a yet further aspect of the present invention, the performing logic step comprises storing interim and or final results from the performing logic step.

In a yet further aspect of the present invention, the performing logic functions step includes the step of determining when a parameter value for a thread has been modified and determining an identity of the parameter that has been modified; and, wherein the performing logic functions step is performed with the identity of the modified parameter used to pick a specific logic function to perform.

In a further embodiment of the present invention, a system for processing is provided, including a parallel hardware thread scheduler, comprising: a main processor; a plurality of memory mapped registers, each of the registers holding a different thread parameter; reconfigurable hardware logic connected to receive a substantial plurality of outputs from the registers in parallel and to perform logic functions substantially simultaneously thereon, in parallel with, but without interrupting the main processor, to determine if thread scheduling should be reconfigured, and if so, determining which thread should be enabled; and a circuit for sending an interrupt signal to interrupt the main processor if thread scheduling is to be reconfigured.

In a yet further aspect of the present invention, a system for processing is provided, including a parallel hardware thread scheduler, comprising: a main processor; a hardware snooping logic detecting from memory traffic selected addresses for parameter values for a plurality of different threads, including a set of registers for holding local copies of the parameter values with the selected addresses, and logic for updating one of the local copies when the address therefor has been detected; reconfigurable hardware logic connected to receive a substantial plurality of outputs from the registers in parallel and to perform logic functions substantially simultaneously thereon, in parallel with, but without interrupting the main processor, to determine if thread scheduling should be reconfigured, and if so, determining which thread should be enabled; and a circuit for sending an interrupt signal to interrupt the main processor if thread scheduling is to be reconfigured.

In a yet further aspect of the present invention, a system for thread scheduling to run in parallel with a main processor is provided, comprising: a first component for obtaining parameter values for a plurality of different threads; a second component for performing logic functions, in parallel with, but without interrupting the main processor, on the parameter values to determine if thread scheduling on the main processor should be reconfigured, and if so, which thread should be enabled; and a third component for sending an interrupt signal to interrupt the main processor if thread scheduling is to be reconfigured.

In a yet further embodiment of the present invention, a system for thread scheduling to run in parallel with a main processor is provided, comprising: reconfigurable hardware for obtaining parameter values for a plurality of different threads; logic for performing first logic functions, in parallel with, but without interrupting the main processor, on the parameter values to determine if thread scheduling on the main processor should be reconfigured and which thread should be enabled; and logic for triggering a second process to run after the first process to perform second logic functions to determine which thread should be enabled when at least one second parameter is updated during a period when the first process is running.

DETAILED DESCRIPTION OF THE PREFERRED EMBODIMENTS

The present invention will be described in the context of several examples. It will be understood by someone of skill in the art that the present invention may be configured in a wide variety of different implementations. Accordingly, the examples presented are not intended to limit the definition of the present invention.

One embodiment of the invention relates to augmenting processors with a hardware thread scheduler functional unit that bases its scheduling decision on programmable scheduling decision criteria that are continuously evaluated using real-time information. A preferred realization employs two pieces of technology: (a) programmable hardware logic, and (b) snooping based registers, tracking dynamically programmable target memory addresses. The latter technique allows arbitrary memory locations to be mapped into hardware registers in the thread scheduler functional unit. Snooping of load/store operation keeps the hardware register coherent with other copies of the data. Using the values stored in these memory-mapped registers, the programmable hardware logic implements re-configurable scheduling decision functions. The result of this functional unit is used in at least two ways: (i) to determine whether an interrupt should be asserted, and (ii) during thread/task switching, which thread/task to enable. In the latter case, the result may be made available to a software thread scheduler. Cheaper alternate realizations are also proposed, such as dispensing with snooping in technique (b), but instead use memory-mapped registers with fixed addresses, and replace re-configurable hardware with micro-code engines.

Figure 3:
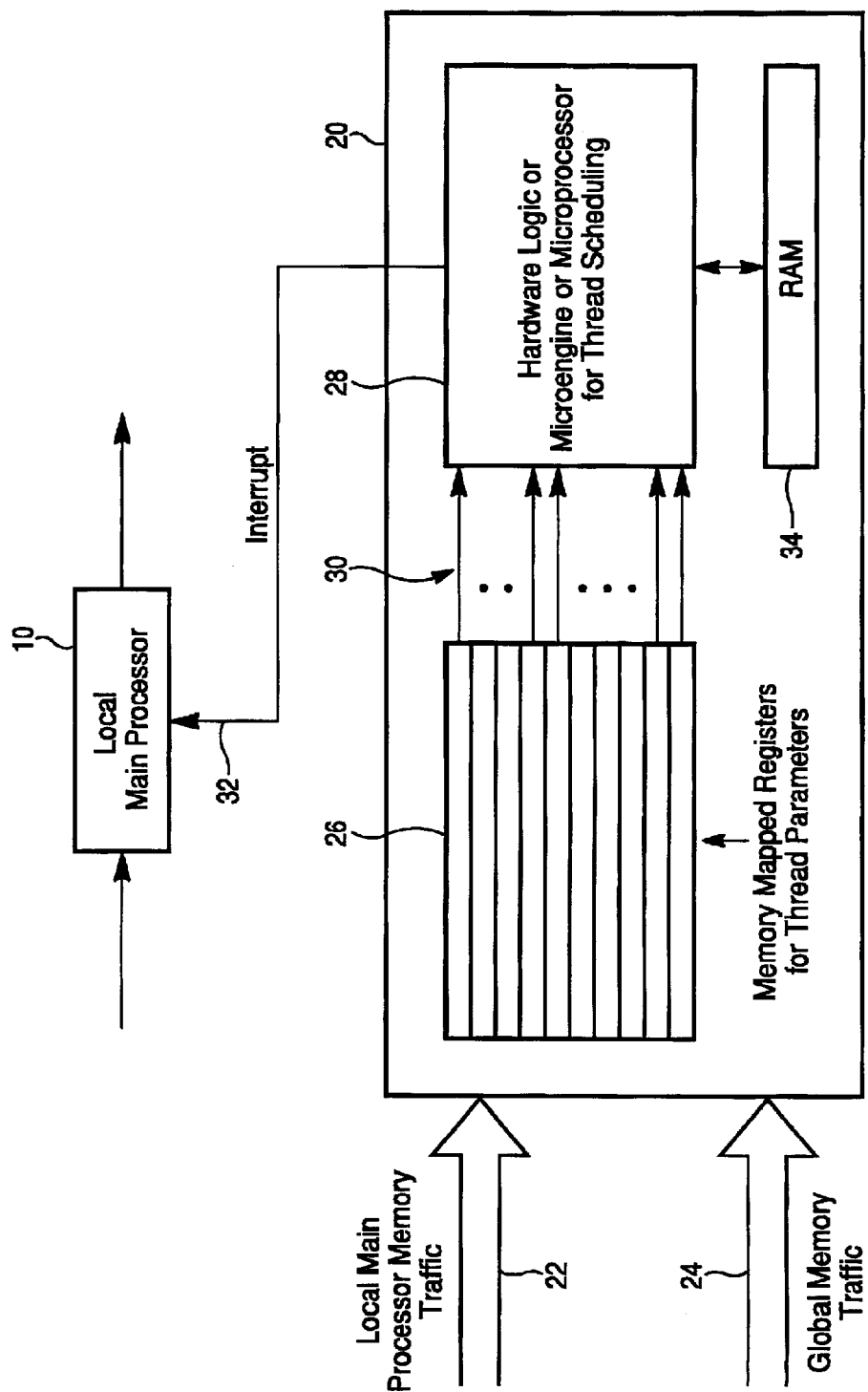
FIG. 3 is a schematic block diagram of one preferred embodiment of the present invention.

Referring now to FIG. 3, a first embodiment of the present invention is shown. One of the important aspects of the present invention is to provide thread scheduling which runs in parallel with a main processor. In a preferred embodiment, this threat scheduling logic should be performed on a continuous basis. Referring now to the figure, there is shown a local main processor 10. Additionally, there is shown a block 20 for performing the steps of obtaining parameter values for a plurality of different threads; performing logic functions, in parallel with and without interrupting the main processor, on the parameter values to determine if thread scheduling should be reconfigured, and if so, which thread should be enabled; and sending an interrupt signal to interrupt the main processor if thread scheduling is to be reconfigured.

In one embodiment, shown in FIG. 3 a plurality of memory mapped registers with fixed addresses 26 are monitored. These memory mapped registers receive, as an input shown diagrammatically by the arrow 22, the memory traffic from the local main processor 10. The memory mapped registers 26 may be disposed at any convenient storage location. Preferably these memory mapped registers are disposed in a fast memory such as registers constructed out of flip-flops, by way of example . These fast memory mapped registers store the various parameters representing the status/progress of the processes running in the different threads, which parameters may change on a continuous or a periodic basis based on the processing of their associated threads. The parameter values from these memory mapped registers 26 are provided via the lines 30 to a block 28 to perform logic functions, in parallel with and without interrupting the main processes, to determine if thread scheduling should be reconfigured, and if so, which thread should be enabled. Block 28 may be implemented in a preferred embodiment, with reconfigurable hardware logic. Typically, the reconfigurable hardware logic would be programmable hardware logic of the type currently manufactured by the companies XILINX and ALTERA, for example. This reconfigurable hardware logic 28 would receive the parameter values from the memory mapped register 26, in a preferred embodiment, in parallel via the lines 30. The hardware logic would be appropriately programmed, based on the thread parameters being monitored, to determine whether an interrupt should be asserted, and further determining which thread should be enabled. The output from this block 28 containing the interrupt signal and a designation of a new thread to be enabled is shown on line 32. Note that thread scheduling logic/function is well known in the processor multi-tasking art, and will vary based upon the thread parameters being monitored.

It should be noted that the block 28 may be alternatively implemented by means of a micro engine running firmware, and may also include a microprocessor for performing some of the logic functions. The use of a micro-code engine has the advantage of reducing the hardware real estate, but at the expense of only approximating a continuous priority evaluation, with the result being a slower re-evaluation of scheduling decisions. Additionally, the block 20 may include a private or local memory 34 for storing interim or final results from the performing logic step accomplished by block 28. Typically, this memory 34 would be implemented by RAM.

Figure 4:
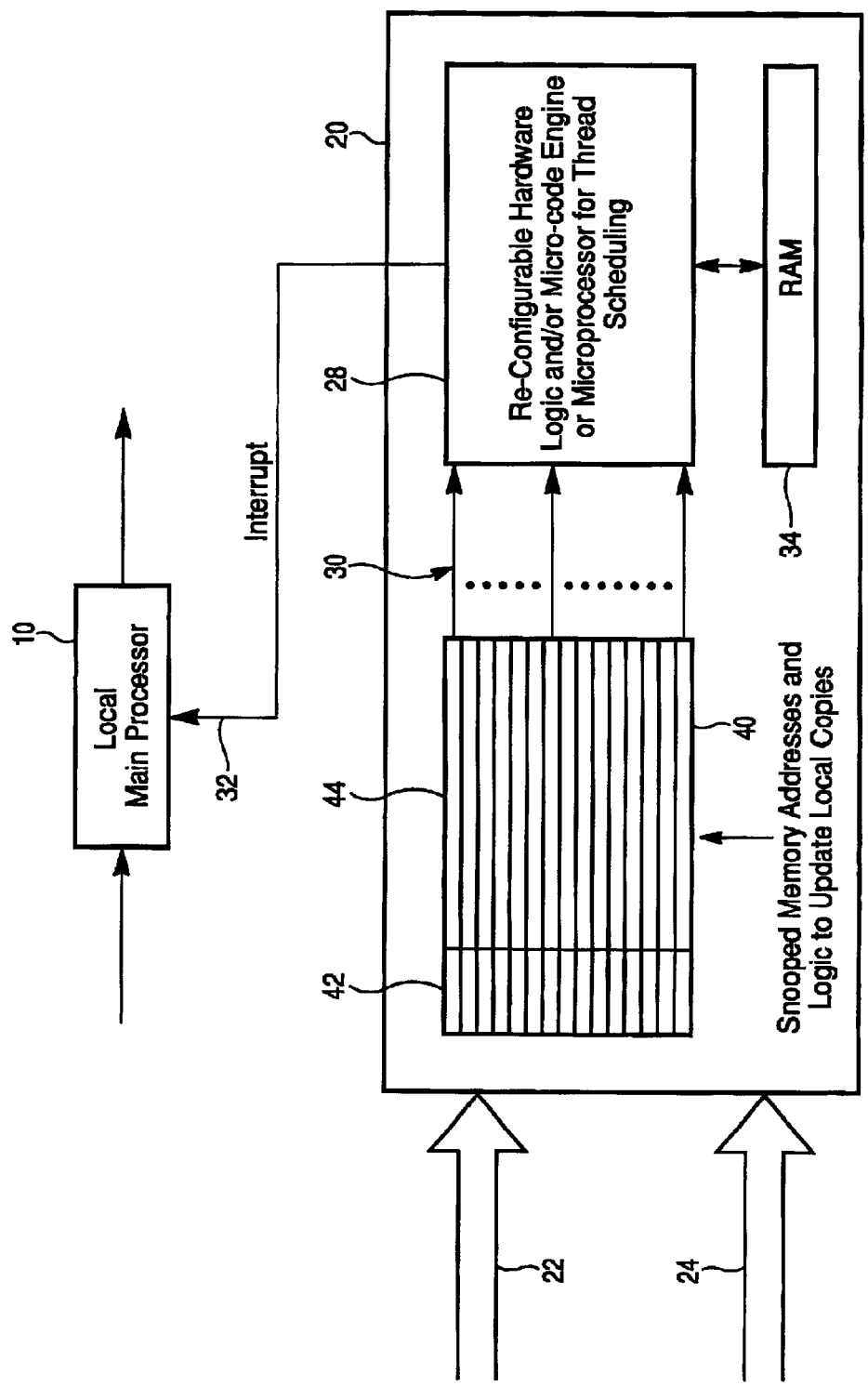
FIG. 4 is a schematic block diagram of a second preferred embodiment of the present invention.

Referring now to FIG. 4, there is shown a preferred embodiment of the present invention. Again there is shown a local main processor 10 and a thread scheduling process 20 being run in parallel with the main processor. However, in the preferred embodiment, the method implementation for obtaining the parameter values for the different threads comprises a snooping logic 40 that maintains a local copy for a plurality of thread parameters to be monitored. A typical snooping logic 40 would comprise a plurality of registers, with each register containing an address portion 42 and a local copy portion 44. Each different register in the block of registers 44 thus contains in the local copy portion 44 a different parameter value for a particular associated thread and, in the portion 42 the address where that parameter value is stored in another memory. Accordingly, in the situation where the processing of a plurality of different threads is being monitored, a local copy of the parameter values for those different threads are stored in this block 40, along with the associated address in the main storage location for those parameter values.

The snooping operation contemplates taking a memory operation snoop from the bus and comparing it in parallel against all of the addresses in the portion 42 of block 40 to determine if there is an address match. The register portions 42 in the block 40 hold all of the addresses of the parameter values that it is interested in monitoring. Typically these registers are implemented by content addressable memories (CAMs).

Standard snooping hardware may be utilized to monitor the memory traffic, represented by the arrow 22, for the local main processor 10. When the memory address for an item of data in this memory traffic matches one of the memory addresses in the block 40, then standard logic is utilized to update the local copy associated with that address value in the block 40. This updated value is then provided via lines 30 to the block 28 to perform logic functions thereon. In a preferred embodiment, the registers in the block 40 are dynamically programmable to hold different addresses so that they can be reconfigured as it is determined that different thread parameters should be monitored. Accordingly, arbitrary memory locations may be mapped into the hardware registers of block 40. The snooping of memory traffic, typically load/store operations, keeps the hardware registers 40 coherent with other copies of the parameter data.

It should be noted that the preferred embodiment shown in FIG. 4 utilizing the snooping logic 40 and further using reconfigurable hardware logic to implement the block 28, provides extremely fast processing because a large plurality, and typically substantially all of the local values of the parameters are provided from the block 40 in parallel to the hardware logic implementing block 28. This parallel operation provides an extremely fast determination of whether an interrupt is required.

It should be noted that the block 28 may include hardware, and in some embodiments a microprocessor, to determine which thread should be enabled, once it has been determined by the reconfigurable hardware logic that an interrupt should be asserted.

Figure 1:
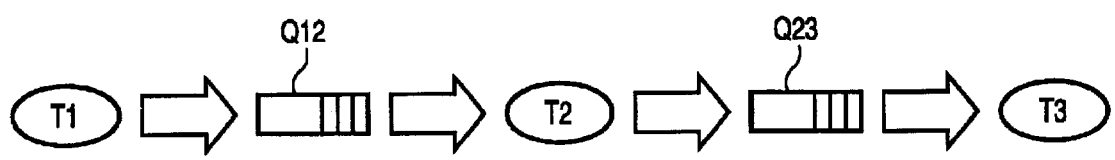
FIG. 1 is a block diagram illustrating three threads which are interrelated.
Figure 2:
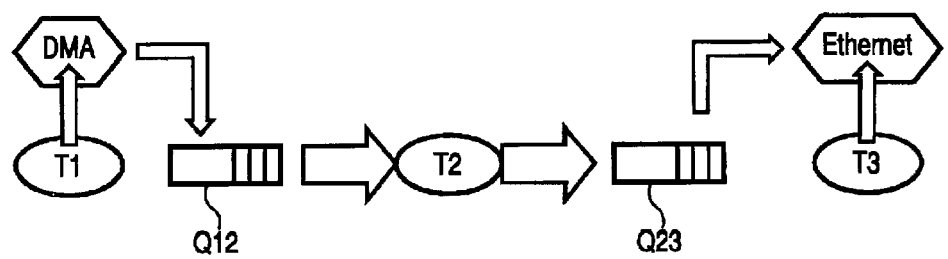
FIG. 2 is a block diagram illustrating three threads in the context of a DMA and Ethernet device.

Using the previous examples of the parameters listed for FIG. 1 and FIG. 2, parameter values may be monitored or snooped that track utilization of the queues Q12 and Q23. By way of example, the head and the tail pointers for Q12 and Q23 could be snooped by the memory mapped registers in the block 40. These parameter values of the head and tail pointers would then be applied via lines 30 to the block 28 and compare these various parameter values to thresholds set for the parameters for these particular queues. The result of this processing would be a signal sent on line 32 indicating that an interrupt should be asserted and a signal indicating which thread to activate. Other parameters which may be tracked may include the time devoted to the current thread being processed, and the amount of data that the thread is able to produce, and the amount of data that the thread has consumed from other queues. Similar "historical" productivity information could be tracked for other threads. These parameter values are then used to complete thread scheduling decisions. In a preferred embodiment, the decision function used to compute the thread scheduling may be programmed by software and may be implemented in a re-configurable hardware logic for continuous monitoring and evaluation.

It should be noted that the snooping logic 40 may include logic to determine whether a particular parameter value has been modified. This identification may be especially useful when the block 28 is implemented by software, either by means of firmware in a microengine or in a microprocessor. The identification of this parameter value which has been modified may then be used in the block 28 to trigger codes for evaluating scheduling decisions based on that parameter value, i.e., the identity of the modified parameter value may be used to cause a specific piece of scheduling evaluation code to run.

In a variation of the foregoing, a table may be associated with the block 40 which identifies a particular piece of code to run when a parameter value in the portion 40 associated with that table location has been changed.

In a further aspect of the program, the present invention could be utilized in a multi-processor system with multiple cooperating processors. In one configuration, each individual processor could have its own parallel running thread scheduling unit that determines which thread its associated processor should run. In a different embodiment, the thread scheduler unit for a processor A may need to know about the store operation from another processor B. Thus, the memory operations that are snooped by a given thread scheduler may include memory operations of its associated local main processor 10 as well as selected memory operations from other processors. These memory operations from other processors are referred to as global memory traffic. Such global memory operations are shown as providing an input 24 to the block 40 in the snoop implementation of FIG. 4. For the implementation of FIG. 3, those memory locations for holding the parameter values for those other processors may also be mapped into the registers 26. Alternatively, a configuration using memory mapped registers with fixed addresses for the local main processor 10 may be used in combination with a snooping embodiment as shown in FIG. 4 for the global memory traffic.

When software/firmware is utilized to perform the logic functions to determine if thread scheduling should be reconfigured, and/or to determine which thread to enable, this operation is much slower than the reconfigurable hardware logic operation. Because of this comparably slower processing, updates to other thread parameters may be received during the time when the microengine or microprocessor is still processing the original parameter set. Accordingly, in a further aspect of the present invention, when a second parameter value is updated/changed while the micro engine or microprocessor is performing the logic functions for the earlier change of another parameter value, then this second updated parameter value may be placed in a queue to be processed by the logic functions in the micro engine or the microprocessor when they are free. The logic function that will be executed for the second parameter value in this instance may be the same as or different from the logic performed for the case where the second parameter value update occurs when the micro engine or the microprocessor are free. Accordingly, any parameter updates that occur while the micro engine or microprocessor is not free, will cause the same or a different re-evaluation logic function to be executed after the micro engine or microprocessor does become free. However, in a preferred embodiment, the re-evaluation process using the logic function is only run once, even if multiple parameters are updated while the micro engine or microprocessor is not free. The identity of this general re-evaluation logic function may be specified in a special register, which may also contain a bit to indicate whether it should be executed after the micro engine or microprocessor becomes free. Note that the determination of whether an interrupt is necessary and/or the determination of which thread to enable after the interrupt is processed, may be implemented by either a micro engine or by a microprocessor.

Accordingly, it can be seen that there are two types of thread scheduling re-evaluation code being utilized in the logic functions for this embodiment. The first type of re-evaluation code is specific to a particular parameter, and is used when the change or update to that parameter is detected when the micro engine or microprocessor is not busy. The second type of re-evaluation code is not specific to a particular parameter update. This second type of re-evaluation code is used when an update to one or more parameters is detected when the micro engine or microprocessor is already busy with an earlier re-evaluation function. Accordingly, this second re-evaluation code deals with situations where many parameters are updated while the micro engine or microprocessor is running on an earlier thread scheduler evaluation function. While it is possible to queue up re-evaluation functions one by one, there is a limit to how many can be accommodated in an operational system. Accordingly, this second re-evaluation code provides a catch-up solution.

It should be noted that typically the code that would be implemented for the first or initial thread scheduler evaluation code and for the second re-evaluation code would be implemented simply by comparing the incoming updated parameter values to a set of threshold values, and making decisions based on whether those threshold values were equaled or exceeded. Additionally, this code may include comparisons between parameter values to determine which parameter value is larger, or to determine whether the difference achieves or equals a pre-determined threshold. The particular threshold set and the particular comparison made will, of course, depend on the threads and the associated parameter values therefore which are being monitored.

In view of the foregoing, it can be seen that in a preferred embodiment, continuous or substantially continuous thread scheduling decisions can be made based on continuous real-time monitoring of parameter values for selected threads.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for reconfiguring thread scheduling comprising the steps of:
   obtaining parameter values by monitoring memory operations for a plurality of different threads, the parameter values each modified by execution of a corresponding one or more of the threads by a processor;
   determining if thread scheduling is to be reconfigured by performing logic functions on the parameter values using a thread scheduler function unit that performs said determining in parallel with, but without interrupting execution by the processor of a currently enabled one of the threads, and, if so, which one of the threads should be enabled; and
   sending an interrupt signal to interrupt the processor after determining that thread scheduling is to be reconfigured.

2. The method as defined in claim 1, wherein said performing logic functions step is performed on a continuous basis.

3. The method as defined in claim 1, wherein the obtaining parameter values step comprises monitoring the values from thread processes held in memory mapped registers with fixed addresses.

4. The method as defined in claim 1, wherein said performing logic functions step comprises performing said logic functions substantially simultaneously on a substantial plurality of said parameter values.

5. The method as defined in claim 1, wherein the performing logic functions step is not performed by a microprocessor, but rather by hardware logic.

6. The method as defined in claim 1, wherein the performing logic functions step comprises performing logic functions on reconfigurable hardware.

7. The method as defined in claim 1, further comprising the step of, during the performing logic functions step, receiving at least one additional parameter value; and performing logic functions with said at least one additional parameter value to determine if thread scheduling should be reconfigured.

8. The method as defined in claim 1, wherein the performing logic functions step comprises performing said logic functions with a microengine or microprocessor.

9. The method as defined in claim 8, further comprising the step of, during performing logic functions step in the microengine or microprocessor, receiving at least one additional parameter value; and when the microengine or microprocessor is free, performing logic functions with said at least one additional parameter value to determine if thread rescheduling should be reconfigured.

10. The method as defined in claim 9, wherein the performing logic functions with the at least one additional parameter comprises performing a different logic function as compared to an immediately preceding logic function performed in the performing logic functions step.

11. The method as defined in claim 1, wherein local copies of the parameter values are held in a set of registers, and wherein said obtaining step comprises snooping memory operations for data addressed to a plurality of predetermined locations and updating the local copies thereof in the set of registers.

12. The method as defined in claim 11, wherein said snooping memory operations include memory operations for the processor and memory operations of other processors in a multiprocessor system.

13. The method as defined in claim 11, further comprising the step of, receiving at least one additional parameter value during the performance of the performing logic functions step; and when the initial performance of the performing logic functions step is completed, performing logic functions with said at least one additional parameter value to determine if thread rescheduling should be reconfigured.

14. The method as defined in claim 1, wherein one of said parameter values is a time devoted to a currently running thread.

15. The method as defined in claim 1, wherein one of said parameter values is an amount of data that a predetermined queue is able to produce.

16. The method as defined in claim 1, wherein one of the parameter values is an amount of data that may be consumed by a predetermined queue.

17. The method as defined in claim 1, wherein the thread scheduling function and the function of the processor are performed on a single chip.

18. The method as defined in claim 1, wherein the performing logic step comprises storing interim and or final results from the performing logic step.

19. The method as defined in claim 1, wherein the performing logic functions step includes the step of determining when a parameter value for a thread has been modified and determining an identity of the parameter that has been modified; and, wherein said performing logic functions step is performed with said identity of the modified parameter used, in part, to pick a specific logic function to perform.

20. The method according to claim 1, further comprising obtaining at least one additional parameter value modified by execution of at least one additional processor and wherein the logic functions are performed on the at least one additional parameter value.

21. A system for processing, including a parallel hardware thread scheduler, comprising:
   a processor for executing threads;
   a plurality of memory mapped registers for monitoring memory operations for a plurality of the threads, each of said registers holding a different thread parameter which is modified by execution of a corresponding one or more of the threads;
   reconfigurable hardware logic connected to receive a plurality of outputs from said registers in parallel and to perform logic functions substantially simultaneously thereon, in parallel with, but without interrupting the processor, to determine if thread scheduling should be reconfigured, and if so, determining which thread should be enabled; and
   a circuit for sending an interrupt signal to interrupt the processor if thread scheduling is to be reconfigured.

22. The system according to claim 21, further comprising at least one additional processor that modifies at least one additional thread parameter value and wherein the logic functions are performed on the at least one additional thread parameter value.

23. A system for processing, including a parallel hardware thread scheduler, comprising:
- a processor for executing threads;
- a hardware snooping logic detecting from memory traffic selected addresses for parameter values for a plurality of the threads, the parameter values each modified by execution of a corresponding one or more of the threads, including a set of registers for holding local copies of said parameter values with said selected addresses, and logic for updating one of said local copies when the address therefor has been detected;
- reconfigurable hardware logic connected to receive a plurality of outputs from said registers in parallel and to perform logic functions substantially simultaneously thereon, in parallel with, but without interrupting the processor, to determine if thread scheduling should be reconfigured, and if so, determining which thread should be enabled; and
- a circuit for sending an interrupt signal to interrupt the processor if thread scheduling is to be reconfigured.

24. A system for reconfiguring thread scheduling comprising:
- a first component for obtaining parameter values by monitoring memory operations for a plurality of different threads, the parameter values each modified by execution of a corresponding one or more of the threads by a processor;
- a second component comprising a thread scheduler function unit for performing logic functions, in parallel with, but without interrupting execution by a processor of a currently enabled one of the threads, on said parameter values to determine if the thread scheduling on the processor should be reconfigured, and if so, which thread should be enabled; and
- a third component for sending an interrupt signal to interrupt the processor after determining that thread scheduling is to be reconfigured.

25. The system according to claim 24, further comprising at least one additional processor that modifies at least one additional parameter value and wherein the logic functions are performed on the at least one additional parameter value.

26. The system according to claim 24, wherein the performing logic functions is performed on reconfigurable hardware.

27. The system according to claim 24, wherein the performing logic functions is performed on a microengine or microprocessor.

28. A system for reconfiguring thread scheduling comprising:
- reconfigurable hardware for obtaining parameter values for a plurality of different threads, the parameter values each modified by execution of a corresponding one or more of the threads by a processor;
- logic for performing first logic functions, in parallel with, but without interrupting the processor, on said parameter values to determine if the thread scheduling on the processor should be reconfigured and which thread should be enabled; and
- logic for triggering second logic functions to be performed after the first logic functions to determine which thread should be enabled when at least one parameter is updated during a period when the first logic functions are being performed.

29. The system according to claim 28, further comprising at least one additional processor that modifies at least one additional parameter value and wherein the logic functions are performed on the at least one additional parameter value.

* * * * *